(12) United States Patent
Li et al.

(10) Patent No.: US 11,360,228 B1
(45) Date of Patent: Jun. 14, 2022

(54) THREE-DIMENSIONAL PREDICTION METHOD BASED ON GEOLOGY-SEISMOLOGY FOR FAVORABLE METALLOGENIC SITE OF SANDSTONE-TYPE URANIUM DEPOSIT

(71) Applicant: BEIJING RESEARCH INSTITUTE OF URANIUM GEOLOGY, Beijing (CN)

(72) Inventors: Ziying Li, Beijing (CN); Qubo Wu, Beijing (CN); Wusheng Liu, Beijing (CN); Mingkuan Qin, Beijing (CN); Shuo Wang, Beijing (CN); Xide Li, Beijing (CN); Chiheng Liu, Beijing (CN); Weitao Li, Beijing (CN); Yuyan Zhang, Beijing (CN)

(73) Assignee: BEIJING RESEARCH INSTITUTE OF URANIUM GEOLOGY, Beijing (CN)

( * ) Notice: Subject to any disclaimer, the term of this patent is extended or adjusted under 35 U.S.C. 154(b) by 0 days.

(21) Appl. No.: 17/587,279

(22) Filed: Jan. 28, 2022

(30) Foreign Application Priority Data

Jul. 22, 2021 (CN) .......................... 202110831473.6

(51) Int. Cl.
*G01V 1/00* (2006.01)
*G01V 1/30* (2006.01)
(52) U.S. Cl.
CPC ...... *G01V 1/306* (2013.01); *G01V 2210/6226* (2013.01)
(58) Field of Classification Search
USPC .......................................................... 367/38
See application file for complete search history.

(56) References Cited

U.S. PATENT DOCUMENTS

| 11,061,165 | B2* | 7/2021 | Wallace | .................. G01V 9/00 |
| 2003/0131993 | A1* | 7/2003 | Zhang | ................. E21B 43/2401 |
| | | | | 166/256 |

(Continued)

FOREIGN PATENT DOCUMENTS

| CN | 110889206 | A | * | 3/2020 |
| CN | 111257926 | A | * | 6/2020 |

OTHER PUBLICATIONS

Decision to Grant for Chinese Patent Application No. 202110831473.6, dated Nov. 18, 2021, 3 pages.

*Primary Examiner* — James R Hulka
(74) *Attorney, Agent, or Firm* — Westman, Champlin & Koehler, P.A.

(57) ABSTRACT

A three-dimensional prediction method based on geology-seismology for a favorable metallogenic site of a sandstone-type uranium deposit is provided, including: determining a to-be-explored area and a target stratum in the to-be-explored area; setting a seismic line in the to-be-explored area, so as to acquire seismic data of a profile where the seismic line is located; delineating a depression region and a target region in the profile; determining a dip angle of a stratum in the target region and a dip angle of a stratum underlying the target region according to the seismic data, where the stratum underlying the target region is within the depression region; determining a distribution of fractures in the target region and the depression region according to the seismic data; and delineating a uranium deposit metallogenic site in the target region.

10 Claims, 3 Drawing Sheets

(56) References Cited

U.S. PATENT DOCUMENTS

| | | | |
|---|---|---|---|
| 2003/0196801 A1* | 10/2003 | Vinegar | E21B 17/028 166/263 |
| 2004/0020642 A1* | 2/2004 | Vinegar | E21B 17/028 166/245 |
| 2007/0209799 A1* | 9/2007 | Vinegar | B09C 1/02 166/302 |
| 2010/0086180 A1* | 4/2010 | Wallace | E21B 49/08 382/109 |
| 2010/0126727 A1* | 5/2010 | Vinegar | E21B 43/305 166/302 |
| 2018/0202264 A1* | 7/2018 | Sarduy | G06N 7/00 |
| 2020/0157887 A1* | 5/2020 | Alonso | E21B 43/30 |

* cited by examiner

THREE-DIMENSIONAL PREDICTION METHOD BASED ON GEOLOGY-SEISMOLOGY FOR FAVORABLE METALLOGENIC SITE OF SANDSTONE-TYPE URANIUM DEPOSIT

CROSS-REFERENCE TO RELATED APPLICATION

This application claims priority to Chinese Patent Application No. 202110831473.6, filed on Jul. 22, 2021, the content of which is incorporated herein by reference in its entirety.

TECHNICAL FIELD

The present disclosure relates to a field of geological information technology, in particular to a three-dimensional prediction method based on geology-seismology for a favorable metallogenic site of a sandstone-type uranium deposit.

BACKGROUND

Uranium is a material basis for technology fields such as the nuclear industry and thus exploration and prediction of uranium deposits are particularly important. A sandstone-type uranium deposit has characteristics of a large scale, no tailings and a good economic benefit. In the art, a prediction for a uranium deposit distribution region is mainly aimed at the sandstone-type uranium deposit. A formation of the sandstone-type uranium deposit is subject to various geological factors, with a plurality of metallogenic control factors and a complex metallogenic process, and most of sandstone-type uranium deposits are blind ores. Therefore, the prediction is difficult, and there is a need to provide a method for effectively predicting a uranium deposit distribution region.

SUMMARY

In view of the above problems, the present disclosure is proposed to provide a method for predicting a uranium deposit metallogenic site using geological-seismic data for overcoming, or at least partially solving the above problems.

According to some embodiments of the present disclosure, a method for predicting a uranium deposit metallogenic site using geologic-seismic data is provided, including: determining a to-be-explored area and a target stratum in the to-be-explored area; setting a seismic line in the to-be-explored area, so as to acquire seismic data of a profile where the seismic line is located; delineating a depression region and a target region in the profile, where the target region is in the target stratum, the depression region underlies the target region, and the depression region and the target region meet conditions that a burial depth of the target stratum in the target region is less than 400 meters, a thickness of strata in the depression region under the target stratum is greater than 1000 meters, and a ratio of the thickness of the strata in the depression region to a total thickness of the strata in the depression region and a stratum above the depression region is greater than 0.6; determining a dip angle of a stratum in the target region and a dip angle of a stratum underlying the target region according to the seismic data, where the stratum underlying the target region is within the depression region; determining a distribution of fractures in the target region and the depression region according to the seismic data; and delineating a uranium deposit metallogenic site in the target region, where the uranium deposit metallogenic site meets conditions that a target stratigraphic dip angle of the uranium deposit metallogenic site is less than 15 degrees, a dip angle of a stratum underlying the uranium deposit metallogenic site is greater than 20 degrees, and a fracture from the depression region to the target region is distributed.

The method for predicting a uranium deposit metallogenic site using geological-seismic data according to the embodiments of the present disclosure may be implemented to predict the uranium deposit distribution region effectively and relatively accurately.

DETAILED DESCRIPTION OF EMBODIMENTS

In order to make the objectives, technical solutions and advantages of the present disclosure more clear, the technical solutions of the present disclosure are clearly and completely described below with reference to the drawings of the embodiments of the present disclosure. However, the described embodiments are only a part but not all of the embodiments of the present disclosure. Based on the embodiments of the present disclosure, all other embodiments obtained by those of ordinary skilled in the art without carrying out creative work fall within the scope of protection of the present disclosure.

It should be noted that unless otherwise defined, technical terms or scientific terms used in the present disclosure shall be of the general meaning understood by those of ordinary skilled in the art. Terms such as "first" and "second" involved in the present disclosure are only used to distinguish similar objects, and should not be construed as indicating or implying their relative importance or order or implicitly indicating a quantity of the indicated technical features. It should be understood that the data described by "first", "second", etc. may be interchanged under appropriate circumstances. The expression "and/or" appearing in the present disclosure means that three parallel solutions may be included. Taking "A and/or B" as an example, it includes solution A alone, solution B alone, or both solution A and solution B. In addition, for ease of description, spatially relative terms, such as "above", "below", "top", "bottom", etc., may be used here to describe only a spatial position relationship between an element or feature and other elements or features as shown in the figure. It should be understood that it also includes different orientations in use or operation other than those shown in the figure.

Figure 1:
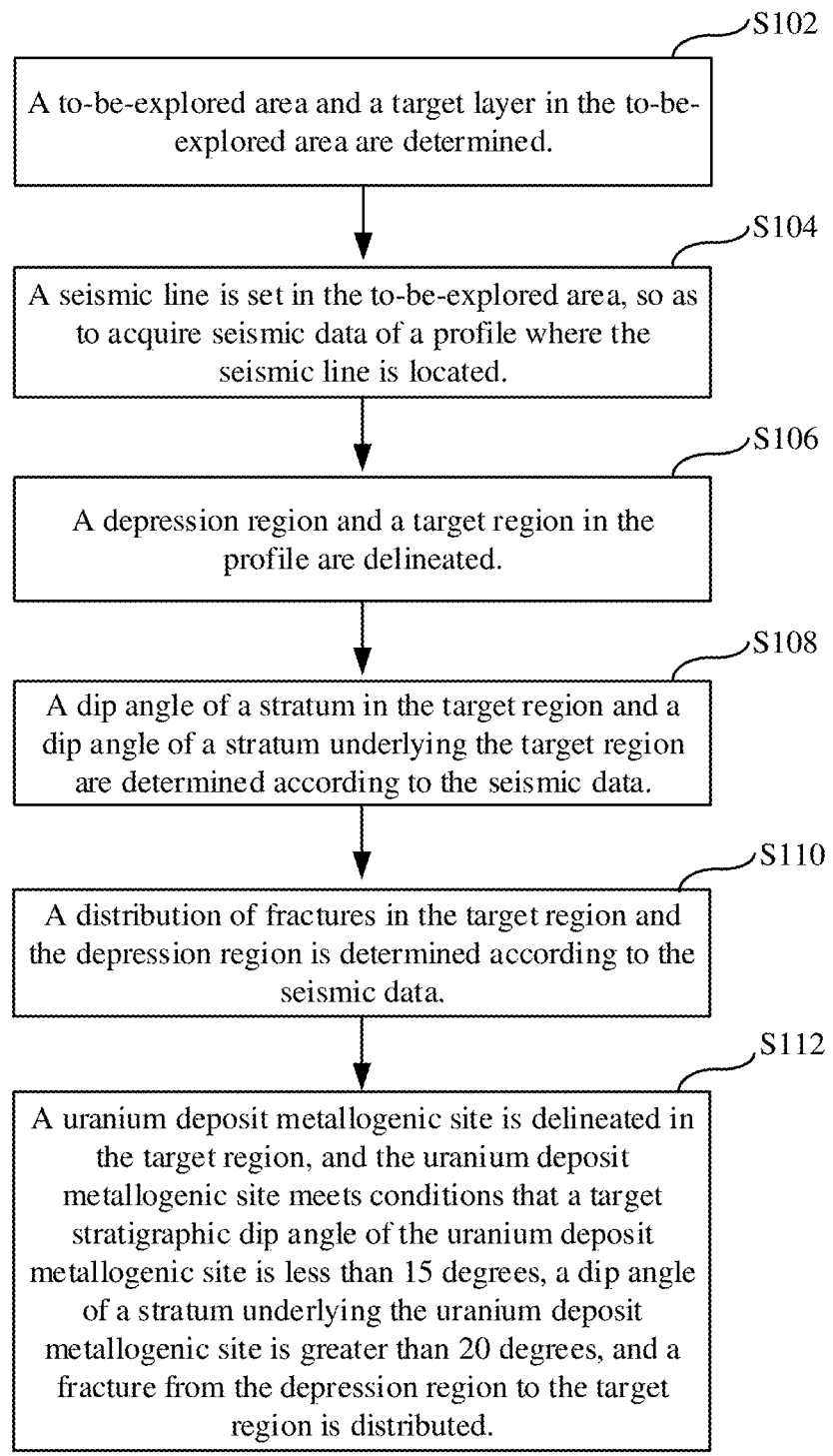
FIG. 1 shows a flowchart of a method for predicting a uranium deposit metallogenic site using geological-seismic data according to an embodiment of the present disclosure.

FIG. 1 shows a flowchart of a method for predicting a uranium deposit metallogenic site using geological-seismic data according to the embodiments of the present disclosure. Referring to FIG. 1, the method includes the following steps.

In step S102, a to-be-explored area and a target stratum in the to-be-explored area are determined.

In step S104, a seismic line is set in the to-be-explored area, so as to acquire seismic data of a profile where the seismic line is located.

In step S106, a depression region and a target region in the profile are delineated, where the target region is in the target stratum, the depression region underlies the target region, and the depression region and the target region meet conditions that: a burial depth of the target stratum in the target region is less than 400 meters, a thickness of strata in the depression region under the target stratum is greater than 1000 meters, and a ratio of the thickness of the strata in the depression region to a total thickness of the strata in the depression region and a stratum above the depression region is greater than 0.6.

In step S108, a dip angle of a stratum in the target region and a dip angle of a stratum underlying the target region are determined according to the seismic data, where the stratum underlying the target region is within the depression region.

In step S110, a distribution of fractures in the target region and the depression region is determined according to the seismic data.

In step S112, a uranium deposit metallogenic site is delineated in the target region, and the uranium deposit metallogenic site meets conditions that: a target stratiphic dip angle of the uranium deposit metallogenic site is less than 15 degrees, a dip angle of a stratum underlying the uranium deposit metallogenic site is greater than 20 degrees, and a fracture from the depression region to the target region is distributed.

Figure 2:
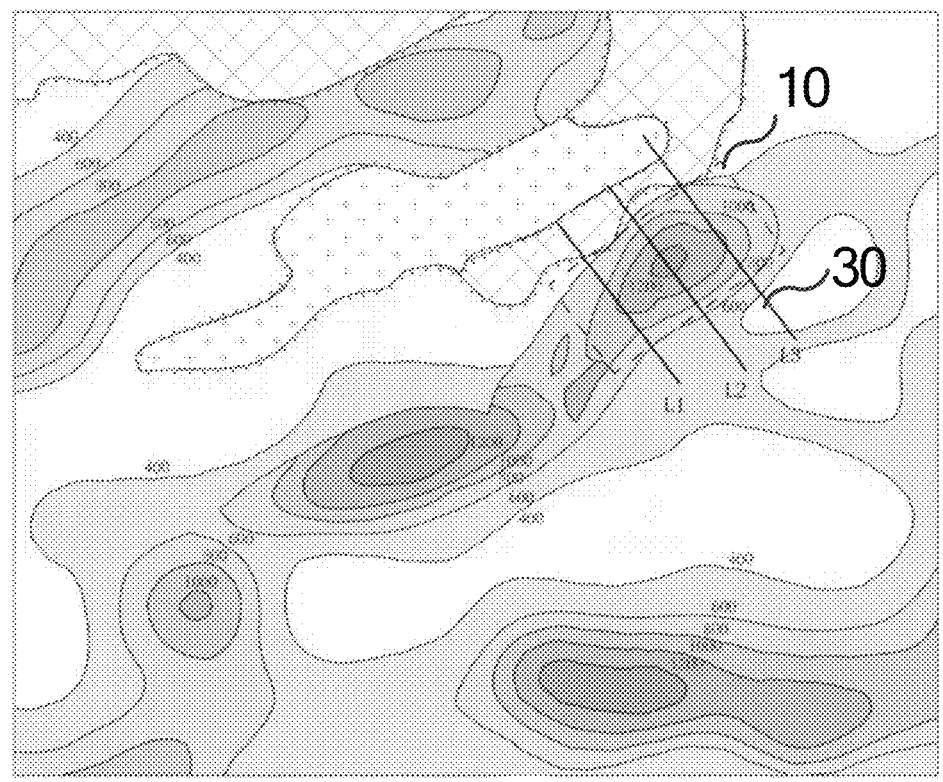
FIG. 2 shows a schematic diagram of a to-be-explored area and seismic lines according to an embodiment of the present disclosure.

In step S102, the to-be-explored area and the target stratum in the to-be-explored area may be determined firstly. Referring to FIG. 2, the to-be-explored area 10 may be a pre-delineated area, such as an elliptical area delineated in FIG. 2. The to-be-explored area 10 may include a surface within the delineated region and all geological structures below the surface. That is, the to-be-explored area 10 may include a plurality of strata.

Figure 3A:
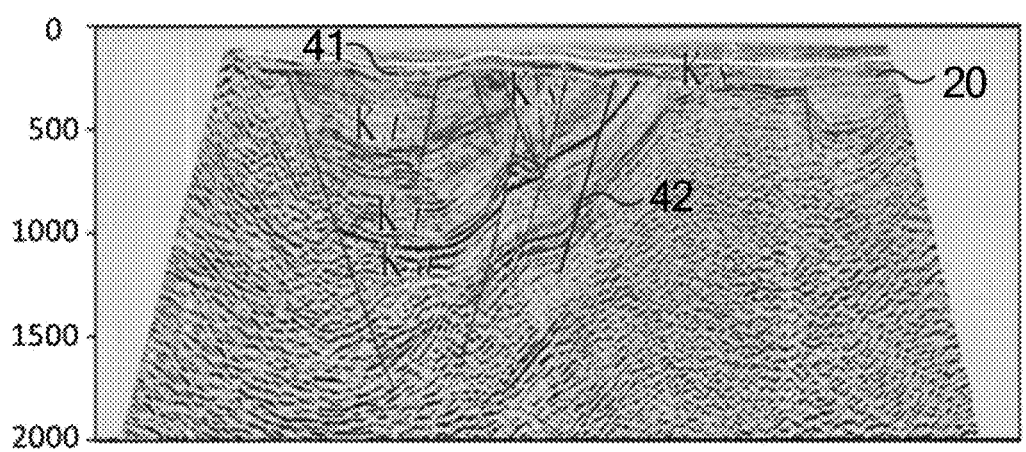
FIGS. 3A and 3B show a seismic interpretation diagram and a geological stratum and fracture interpretation diagram for seismic data according to an embodiment of the present disclosure.
Figure 3B:
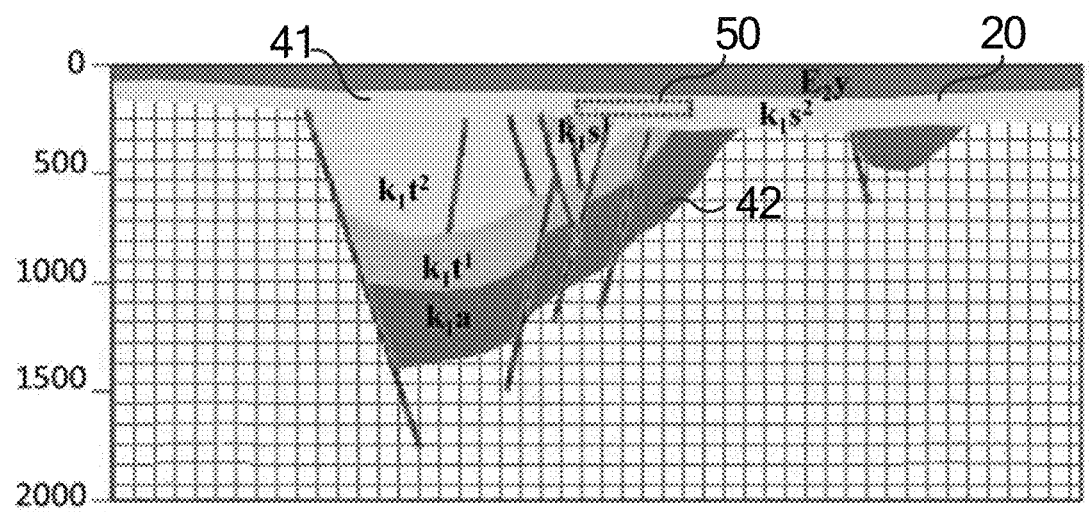

Referring to FIG. 3A and FIG. 3B, a target stratum 20 may be a stratum in the to-be-explored area 10. Formal rock-stratigraphic units are formally named groups, formations, members, beds, etc., which are divided and defined according to a stratigraphic sequence and unified rule. A certain stratum and different strata described above may refer to strata of different members or strata of different formations, etc. A member is a rock-stratigraphic unit lower than a formation and higher than a bed. A formally named member needs to have a significantly different lithological characteristic from an adjacent rock stratum in a formation and have a wide distribution, and may represent a member with an obvious lithological characteristic in the formation. That is, the to-be-explored area 10 may include a plurality of formations, and the plurality of formations may respectively include a plurality of members. The target stratum 20 in the embodiments of the present disclosure may be one of the plurality of members. Although the method for predicting the uranium deposit distribution region in the embodiments of the present disclosure may be theoretically applied to an arbitrarily delineated to-be-explored area 10, a uranium deposit distribution probably does not exist in the arbitrarily delineated to-be-explored area 10, and thus it is meaningless to perform a subsequent step in the to-be-explored area 10. Therefore, in a practical work process, those skilled in the art may determine a uranium exploration region that has been announced in geological data and survey data as the to-be-explored area 10. There is a high probability of uranium deposit distribution in such a to-be-explored area 10, but a specific location of the uranium deposit is not clear. Using the method provided by the embodiments of the present disclosure in such a to-be-explored area 10 may greatly improve an efficiency of predicting the specific location of the uranium deposit.

In some embodiments, since in step S106, the depression region and the target region need to be delineated in the profile where the seismic line is located, when determining the to-be-explored area 10 in step S102, a region with a depression may be firstly found according to the geological data, and a structure, a basement depth, and a spatial distribution of the depression as well as a sedimentary strata division, a sedimentary facies and a rock formation characteristic in the region may be further determined. After it is initially determined that a uranium deposit distribution probably exists in the region according to the data, the region may be delineated as the to-be-explored area 10.

Similarly, the target stratum 20 may be a member in the to-be-explored area 10 most likely to contain a uranium deposit distribution. After the to-be-explored area 10 is determined according to the geological data, the target stratum 20 most likely to contain a uranium deposit distribution in the to-be-explored area 10 may be further determined according to the above-mentioned geological data and in combination with uranium deposit metallogenic conditions. In some embodiments, those skilled in the art may firstly acquire the target stratum 20 likely to contain a uranium deposit distribution. In this case, a stratum distribution at the location of the target stratum 20 may be determined according to the geological material, and a region with a depression below the target stratum may be determined as the to-be-explored area 10. That is, the target stratum 20 is firstly determined and then the to-be-explored area 10 is determined according to the target stratum 20.

In some specific embodiments, the inventors conducted a practical exploration at the Saihangaobi Uranium Deposit in the Erlian Basin. Referring to FIG. 2, a stratigraphic contour map of the target region is shown. In FIG. 2, points with the same stratigraphic depth are connected to form a closed curve, which may intuitively show a position of a depression in this region, for example, the to-be-explored area 10 is delineated by a dotted box in the figure. Further, in the specific embodiments, referring to FIG. 3A and FIG. 3B, Saihan formation upper member $k_1s^2$ is determined as the target stratum 20 by consulting the geological data.

Several methods of determining the to-be-explored area 10 and the target stratum 20 have been described above. However, it may be understood that the determination of the to-be-explored area 10 and the target stratum 20 in step S102 is performed actually to determine a scope of work in a subsequent step. The more suitable the scope is determined, the higher the prediction efficiency in the subsequent step will be. Those skilled in the art may use any suitable method to determine the to-be-explored area 10 and the target stratum 20, and even may determine the target stratum 20 based on a prediction result acquired by an existing prediction method and then predict using the prediction method provided by the embodiments of the present disclosure, so as to acquire a more accurate uranium deposit distribution region, which will not be repeated here.

In step S104, the seismic line is set in the to-be-explored area 10, and the seismic data of the profile where the seismic line is located may be acquired. The seismic line may be a seismic line in a two-dimensional seismic exploration system commonly used in the art. Still referring to FIG. 2, the seismic line 30 is generally a straight line. A shot point and a receiving point are generally deployed on the seismic line, a seismic source may be used at the shot point to generate a seismic wave, and the receiving point is used to receive a reflected seismic wave, so as to acquire seismic data at the profile where the seismic line 30 is located.

In some embodiments, a plurality of seismic lines 30 may be set in step S104, and a uranium deposit metallogenic position in a profile where each seismic line is located may be predicted, using relevant steps described below.

In the embodiments in which the plurality of seismic lines 30 are set, still referring to FIG. 2, each seismic line 30 may extend along a short axis of the to-be-explored area 10, and the plurality of seismic lines 30 are arranged along a long axis of the to-be-explored area 10. In some embodiments, the plurality of seismic lines 30 may be arranged at equal spacing. That is, the plurality of seismic lines 30 are evenly arranged along the long axis of the to-be-explored area 10, and every two adjacent seismic lines 30 are spaced by the same distance. In some embodiments, each two adjacent seismic lines 30 may be spaced by a different distance. For example, when it is pre-determined according to the geological data that a certain site in the to-be-explored area 10 is more likely to contain a uranium deposit, the seismic lines 30 may be densely arranged in this site, which may be set by those skilled in the art according to actual requirements and will not be described here in detail.

The profile where the seismic line 30 is located generally refers to a vertical plane the seismic line 30 passes through. After the seismic data is acquired during an earthquake in step S104, the seismic data may be preprocessed firstly. For example, CGG and Geoeast seismic processing softwares may be used to perform refined processing such as filtering, amplitude recovery and denoising on the original data acquired during the earthquake, and then Landmark interpretation software, geoview inversion software, etc. may be used to perform stratigraphic interpretation, fracture interpretation, sand body inversion, etc. on the refined seismic data to acquire the stratum depth data, fracture interpretation data, and sand body distribution data of the profile where the seismic line is located, so as to determine information such as depression form, basement depth, stratigraphic development, stratigraphic occurrence, and distribution. In some embodiments, a seismic interpretation map shown in FIG. 3A may be acquired after the stratigraphic interpretation. Those skilled in the art may further draw the geological stratum and fracture interpretation map shown in FIG. 3B according to the seismic interpretation map in FIG. 3A, so as to better perform a subsequent analysis.

It should be noted that although the relevant steps below are described in detail by taking FIG. 3A and FIG. 3B as examples, these steps do not rely on the stratigraphic interpretation map and schematic diagrams shown in FIG. 3A and FIG. 3B, and only rely on the original seismic data. Those skilled in the art may use any suitable method to process the original data to implement the following relevant steps, which are not specifically limited here.

In step S106, it is needed to determine the depression region and the target region in the profile where the seismic line 30 is located. The target region is in the target stratum, and the depression region underlies the target region. As described above, the depression region and the target region need to meet the conditions that: a burial depth of the target stratum in the target region is less than 400 meters, a thickness of strata in the depression region under the target stratum is greater than 1000 meters, and a ratio of the thickness of the strata in the depression region to a total thickness of the strata in the depression region and a stratum above the depression region is greater than 0.6.

FIG. 3B shows a target region 41 and a depression region 42 determined in a specific embodiment. In some embodiments, the depression region 42 may be delineated firstly, and then the target region 41 in the target stratum 20 may be delineated. Specifically, as described above, the target stratum 20 may be a member, such as the Saihan formation upper member $k_1s^2$ shown in FIG. 3A and FIG. 3B. When delineating the depression region 42, the depression region 42 may include a plurality of strata. In the practical work, a thickness of each stratum below the target stratum 20 in the profile may be determined, for example, according to the seismic data described above, so as to delineate a region with a thickness greater than 1000 meters. It may be understood that such a region is generally V-shaped or U-shaped, and the thickness of this region may refer to a distance from a bottom of the V-shaped region or U-shaped region to a top of the V-shaped region or U-shaped region. After delineating the region with a thickness greater than 1000 meters, a ratio of the thickness of the region to a total thickness of the region and the stratum above the region may be further determined. If the ratio is greater than 0.6, the region will be determined as the depression region 42.

The depression region 42 may include a plurality of members of strata or even a plurality of formations of strata. For example, in the specific embodiment shown in FIG. 3A and FIG. 3B, the depression region 42 may sequentially include Saihan formation lower member $k_1s^1$, Tengger formation upper member $k_1t^2$, Tengger formation lower member k1t1, Alshan formation $k_1a$, etc. from top to bottom.

In some embodiments, when delineating the depression region and the target region, it is needed to further meet a condition that a reducing stratum or a reducing organic-matter-rich stratum is developed in the depression region. The reducing stratum may be a stratum developed with gray rock series, gray-black rock series and other reducing rock series, such as coal measures or oil-gas-bearing source rock series stratum. The reducing organic-matter-rich stratum is a stratum containing rich organic matter, such as a stratum with a content of organic matter greater than a predetermined value, and the predetermined value may be determined by those skilled in the art according to an actual situation. Such a reducing stratum may provide a reducing agent for the formation of a uranium deposit, and thus may be used as one of favorable metallogenic factors. In such an embodiment, after the depression region 42 is delineated, an occurrence characteristic of each stratum in the depression region 42 may be further determined, for example, it may be determined from the seismic data described above, or be determined by consulting geological data. In this embodiment, if no reducing stratum is developed in the delineated depression region 42, or a proportion of reducing stratum is low, the region may not be delineated as the depression region 42. In some other embodiments, a reducing stratum below the target stratum 20 may be determined firstly, and then the depression region 42 may be determined according to a thickness of the reducing stratum. Those skilled in the art may make a selection according to the actual situation, which is not specifically limited here.

The depression region 42 means a sedimentary tectonic evolution, and such tectonic evolution plays a significant role in controlling the formation, accumulation and post-transformation of uranium deposit. Therefore, the target region 41 may be delineated above such depression region 42.

Since the target stratum in the target region 41 needs to have a burial depth less than 400 meters, when delineating the target region 41, a region above the depression region 42 may be firstly delineated in the target stratum. For example, a region in the target stratum 20 corresponding to a part between two side boundaries of the depression region 42 may be delineated. Then, the burial depth of the target stratum in this region may be further determined according to, for example, the seismic data. Then a part of the region above the depression region 42 where the burial depth of the target stratum is less than 400 meters is delineated as the target region 41.

In some embodiments, since a sandstone-type uranium deposit is formed in a sand body, when delineating the target region 41, it is possible to further meet a condition that a sand body is developed in the target region. Specifically, a wave impedance inversion calculation may be performed on the seismic data to acquire a sand body distribution in the target stratum 20. Then, when delineating the target region 41, a region with a burial depth of less than 400 meters and with a sand body developed therein is delineated as the target region 41, so that the prediction of uranium deposit metallogenic site may be more accurate.

Various methods for delineating the target region 41 and the depression region 42 are describe in the above embodiments, and those skilled in the art may use one or a combination of the above-described methods to delineate the target region 41 and the depression region 42, or may select any other suitable method, as long as the final delineated target region 41 and depression region 42 can meet the conditions that the burial depth of the target region is less than 400 meters, the thickness of the depression region is greater than 1000 meters, and the ratio of the thickness of the depression region to the total thickness of the depression region and the stratum above the depression region is greater than 0.6. In some embodiments, as long as the final delineated target region 41 and depression region 42 can further meet the conditions that a reducing stratum is developed in the depression region and a sand body is developed in the target region.

After the target region 41 and the depression region 42 are delineated, in step S108, the dip angle of the stratum in the target region and the dip angle of the stratum underlying the target region may be determined according to the seismic data. Here, the dip angle of the stratum refers to an angle between a strike of the stratum and a horizontal line. In some embodiments, stratigraphic interpretation may be performed on the seismic data to acquire the stratigraphic interpretation data of the target region 41 and the depression region 42, and then the dip angle of the stratum may be acquired according to the stratigraphic interpretation data. Those skilled in the art may also select other suitable methods to acquire the dip angle of the stratum, which is not specifically limited here.

Still referring to FIG. 3A and FIG. 3B, the depression region 42 may include a plurality of strata, such as Saihan formation lower member $k_1s^1$, Tengger formation upper member $k_1t^2$, Tengger formation lower member k1t1, and Alshan formation $k_1a$ shown in FIG. 3B. The stratum underlying the target region 41 refers to the stratum below the target stratum (Saihan formation lower member $k_1s^2$) in the target region 41 and in contact with the stratum in the target region 41, and the depression region 42 may include a plurality of such strata. For example, each of Saihan formation lower member $k_1s^1$, Tengger formation upper member $k_1t^2$, Tengger formation lower member k1t1, and Alshan formation $k_1a$ shown in FIG. 3B has a part in contact with Saihan formation lower member $k_1s^2$ in the target region 41. Therefore, the stratigraphic dip angles of these parts and the stratigraphic dip angles of Saihan formation lower member $k_1s^2$ in the target region 41 at locations of these parts may be determined according to the seismic data.

Further, in step S110, the distribution of the fracture in the target region 41 and the depression region 42 may be determined according to the seismic data. Based on data collected in the past, the existence of most uranium deposits is closely related to the existence of an underground fracture. In particular, when the fracture extends upwards from a deep part, it may provide a uranium source from the deep part, provide a reducing agent required for mineralization, and carry out a superimposed transformation of the uranium deposit in a later stage. In some embodiments, the distribution of the fractures in the target region 41 and the depression region 42 may be acquired after a fracture interpretation is performed on the seismic data according to the method described above, which will not be described in detail here.

In step S112, the uranium deposit metallogenic site may be delineated in the target region according to the dip angle acquired in step S108 and the distribution of the fractures determined in step S110. As described above, the uranium deposit metallogenic site meets the conditions that the target stratigraphic dip angle of the uranium deposit metallogenic site is less than 15 degrees, the dip angle of the stratum underlying the uranium deposit metallogenic site is greater than 20 degrees, and a fracture from the depression region to the target region is distributed.

Specifically, still referring to FIG. 3B, in order to find the uranium deposit metallogenic site meeting the above conditions, a site, with a dip angle greater than 20 degrees, in the contact parts of Saihan formation lower member $k_1s^1$, Tengger formation upper member $k_1t^2$, Tengger formation lower member k1t1, and Alshan formation $k_1a$ with Saihan formation lower member $k_1s^2$ may be firstly delineated according to the dip angle determined in step S108; then a site of Saihan formation lower member $k_1s^2$ in the target region where a dip angle at the location of the site in the contact parts is less than 15 degrees may be determined according to the dip angle acquired in step S108, and it may be further determined according to step S110 whether there is a fracture from the depression region 42 to the target region 41 at the site of Saihan formation lower member $k_1s^2$. If all are satisfied, it is determined that this site is a uranium deposit metallogenic site, such as a uranium deposit metallogenic site 50 shown in FIG. 3B.

In the prediction method for the embodiments of the present disclosure, it is only needed to arrange seismic lines and analyze seismic data to predict the uranium deposit metallogenic site, and a high prediction efficiency may be achieved. In addition, the stratigraphic dip angle at the finally determined uranium deposit metallogenic site is less than 15 degrees and the dip angle of the stratum underlying the uranium deposit metallogenic site is greater than 20 degrees, that is, a high angular unconformity exhibits between the uranium deposit metallogenic site and the underlying stratum, which may favor a supply of reducing agent from the underlying stratum to the upper stratum. Further, a fracture from the depression region to the target region exits at the uranium deposit metallogenic site, which makes it easier for the lower stratum to provide reducing agent to the upper stratum. Therefore, the uranium deposit metallogenic site meeting these conditions has an extremely high metallogenic probability, and the prediction result may be relatively accurate.

Figure 4:
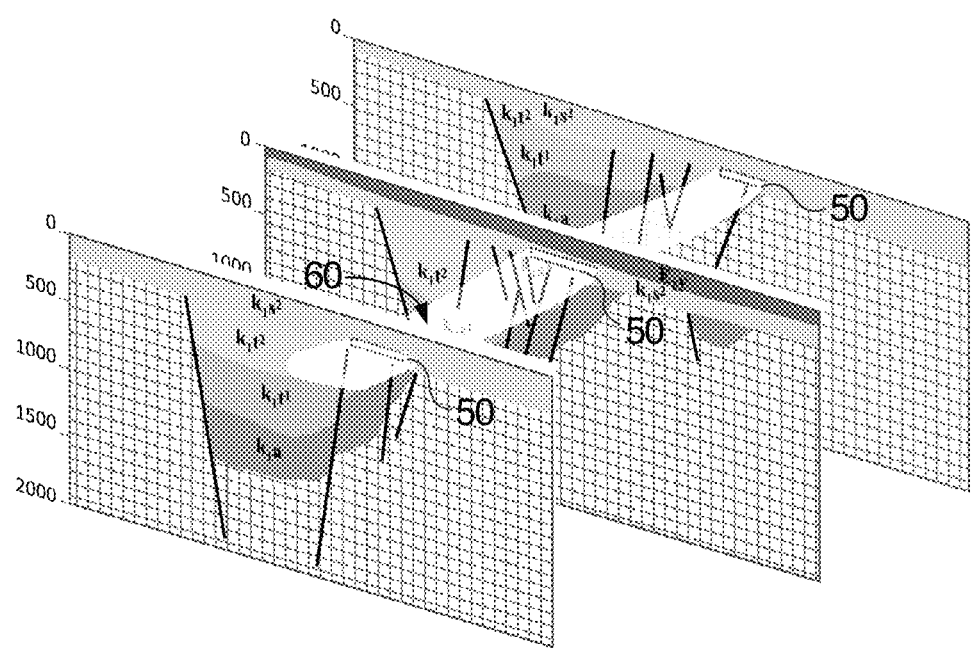
FIG. 4 shows a schematic diagram of a three-dimensional metallogenic region of a uranium deposit according to an embodiment of the present disclosure.

In some embodiments, as described above, a plurality of seismic lines may be arranged in step S104. In such embodiments, the method described above may be used to determine the uranium deposit metallogenic site at the profile where each seismic line is located. It may be understood that the uranium deposit distribution region determined in each profile is actually a two-dimensional region, while a uranium deposit is generally continuously distributed in a region in a three-dimensional space. In view of this, in some embodiments, referring to FIG. 4, after determining the uranium deposit distribution region in the profile where each seismic line 30 is located, the uranium deposit metallogenic sites 50 in each profile may be connected to form a three-dimensional uranium deposit metallogenic region 60 according to the positional relationship between the seismic lines 30, so as to provide three-dimensional spatial data for subsequent mining. This step may be implemented by, for example, computer three-dimensional simulation software Gocad, etc., which will not be described in detail here.

In the description of the specification, the description with reference to the terms "an embodiment", "some embodiments", "example", "specific example" or "some examples" means that the specific feature, structure, material or characteristic described in conjunction with the embodiment or example is included in at least one embodiment or example of the present disclosure. In the specification, the schematic representations of the above terms do not necessarily refer to the same embodiment or example. Moreover, the specific features, structures, materials or characteristics described may be combined in any one or more embodiments or examples in a suitable manner. In addition, those skilled in the art may combine the different embodiments or examples and the features of the different embodiments or examples described in the specification in case of no contradiction.

Although the embodiments of the present disclosure have been shown and described above, it may be understood that the above embodiments are exemplary and should not be construed as limiting the present disclosure. Those ordinary skilled in the art may make changes, modifications, replacements and transformations on the above-described embodiments within the scope of the present disclosure.

What is claimed is:

1. A method for predicting a uranium deposit metallogenic site using geologic-seismic data, comprising:
    determining a to-be-explored area and a target stratum in the to-be-explored area;
    setting a seismic line in the to-be-explored area, so as to acquire seismic data of a profile where the seismic line is located;
    delineating a depression region and a target region in the profile, wherein the target region is in the target stratum, the depression region underlies the target region, and the depression region and the target region meet conditions that a burial depth of the target stratum in the target region is less than 400 meters, a thickness of strata in the depression region under the target stratum is greater than 1000 meters, and a ratio of the thickness of the strata in the depression region to a total thickness of the strata in the depression region and a stratum above the depression region is greater than 0.6;
    determining a dip angle of a stratum in the target region and a dip angle of a stratum underlying the target region according to the seismic data, wherein the stratum underlying the target region is within the depression region;
    determining a distribution of fractures in the target region and the depression region according to the seismic data; and
    delineating a uranium deposit metallogenic site in the target region, wherein the uranium deposit metallogenic site meets conditions that a target stratigraphic dip angle of the uranium deposit metallogenic site is less than 15 degrees, a dip angle of a stratum underlying the uranium deposit metallogenic site is greater than 20 degrees, and a fracture from the depression region to the target region is distributed.

2. The method for claim 1, wherein in the delineating a depression region and a target region in the profile, the depression region and the target region further meet a condition that a reducing stratum or a reducing organic-matter-rich stratum is developed in the depression region.

3. The method for claim 2, wherein the reducing stratum or the reducing organic-matter-rich stratum comprises at least one of a coal-bearing stratum, an oil-gas-bearing source rock series stratum, or a stratum with a content of organic matter beyond a predetermined value.

4. The method of claim 1, wherein in the delineating a depression region and a target region in the profile, the depression region and the target region further meet a condition that a sand body is developed in the target region; and
    the method further comprises:
    performing a wave impedance inversion calculation on the seismic data to acquire distribution data of a sand body in the target stratum.

5. The method for claim 1, wherein the determining a dip angle of a stratum in the target region and a dip angle of a stratum underlying the target region according to the seismic data comprises:
    performing a stratigraphic interpretation on the seismic data, so as to acquire stratigraphic interpretation data of the target region and the depression region; and
    determining the dip angle of the stratum in the target region and the dip angle of the stratum underlying the target region according to the stratigraphic interpretation data.

6. The method for claim 1, wherein the providing a seismic line in the to-be-explored area comprises:
    setting a plurality of seismic lines in the to-be-explored area, wherein each seismic line extends along a short axis of the to-be-explored area.

7. The method for claim 6, wherein the plurality of seismic lines are arranged along a long axis of the to-be-explored area.

8. The method for claim 6, wherein the plurality of seismic lines are arranged at the same spacing.

9. The method for claim 6, wherein the plurality of seismic lines are arranged at different spacing.

10. The method of claim 6, further comprising:
    determining a uranium deposit metallogenic site in a profile where each of the plurality of seismic lines is located; and
    connecting, according to a positional relationship between the plurality of seismic lines, the uranium deposit metallogenic site in the profile where each of the plurality of seismic lines is located, so as to acquire a three-dimensional metallogenic region of the uranium deposit.

* * * * *